United States Patent
Fackler et al.

(10) Patent No.: US 6,905,996 B2
(45) Date of Patent: *Jun. 14, 2005

(54) METHOD OF MAKING A CERAMIC ARTICLE

(75) Inventors: Helmut Fackler, Lauingen (DE); Hagen Demes, Obertshausen (DE)

(73) Assignee: Dow Corning Limited (GB)

( * ) Notice: Subject to any disclaimer, the term of this patent is extended or adjusted under 35 U.S.C. 154(b) by 54 days.

This patent is subject to a terminal disclaimer.

(21) Appl. No.: 10/433,208

(22) PCT Filed: Dec. 5, 2001

(86) PCT No.: PCT/EP01/14699

§ 371 (c)(1), (2), (4) Date: May 30, 2003

(87) PCT Pub. No.: WO02/46118

PCT Pub. Date: Jun. 13, 2002

(65) Prior Publication Data

US 2004/0029712 A1 Feb. 12, 2004

(30) Foreign Application Priority Data

Dec. 7, 2000 (GB) .............................................. 0029776

(51) Int. Cl.⁷ .............................................. C04B 33/00
(52) U.S. Cl. .......................... 501/155; 501/141; 501/146
(58) Field of Search ............................ 501/155, 141–148

(56) References Cited

U.S. PATENT DOCUMENTS

| | | | | |
|---|---|---|---|---|
| 4,226,635 A | | 10/1980 | Kindrick | 106/306 |
| 4,408,030 A | | 10/1983 | Marko | 528/10 |
| 4,690,810 A | | 9/1987 | Breneman et al. | 423/335 |
| 5,876,609 A | | 3/1999 | White et al. | 210/725 |
| 6,478,870 B2 | * | 11/2002 | Marko | 106/745 |
| 6,635,109 B1 | * | 10/2003 | Wineland et al. | 106/724 |

FOREIGN PATENT DOCUMENTS

| | | |
|---|---|---|
| DE | 3713482 | 11/1988 |
| DE | 4333235 | 4/1995 |
| EP | 314971 | 5/1989 |

* cited by examiner

Primary Examiner—Karl Group
(74) Attorney, Agent, or Firm—Robert L. McKellar; McKellar IP Law, PLLC

(57) ABSTRACT

This invention provides methods for making ceramic articles with improved density, compression strength and efflorescence properties, in which a pre-ceramic article containing direct process residue gel is heated at an elevated temperature.

10 Claims, No Drawings

METHOD OF MAKING A CERAMIC ARTICLE

TECHNICAL FIELD

The present invention relates to a clay composition containing direct process residue gel, and uses for direct process residue gel, for example in the manufacture of ceramics.

BACKGROUND AND PRIOR ART

Organohalosilanes, halosilanes, and in particular methylchlorosilanes, are the building blocks from which silicone polymers are produced. Organohalosilanes and halosilanes are commercially produced by what is commonly called "the direct process", in which silicon metal is reacted with an organic halide or hydrogen chloride, optionally in the presence of a catalyst. The direct process is well known in the art, and is well described in patent literature.

In, for example, the commercial production of methylchlorosilanes by the direct process, finely ground silicon metal powder is reacted with methyl chloride in the presence of a catalyst by fluidising the silicon powder in a fluid bed by passing methyl chloride gas there through at a temperature of between 200° C. and 500° C. A by-product of the direct process is direct process residue (DPR). DPR comprises the higher boiling point halosilanes produced by the direct process. DPR is a chemically active, hazardous material, whose reactivity must be reduced prior to transportation and/or disposal. Thus, once separated from the other reaction products, DPR is neutralised, for example, with lime solution, to reduce its activity, and dewatered, resulting in a gel-solids mixture, referred to hereinafter as "DPR gel". Methods for neutralising DPR are well known in the art, see for example U.S. Pat. No. 4,408,030 (Dow Corning), U.S. Pat. No. 4,690,810 (Union Carbide) and U.S. Pat. No. 5,876,609 (General Electric).

DPR gel is presently a cost creating waste material. The present inventors have now found a useful way of utilising DPR gel in which the DPR gel is used as an additive in pre-ceramic mixtures. The resulting ceramic articles typically demonstrate improved physical and/or physicochemical properties.

SUMMARY OF THE INVENTION

According to a first aspect of the invention there is provided a method for making a ceramic article with improved efflorescence properties, which method comprises forming a pre-ceramic article comprising from 0.01 to 20 wt % of direct process residue gel, and baking the article at an elevated temperature.

According to a second aspect of the invention there is provided a method for making a ceramic article with lower density, which method comprises forming a pre-ceramic article comprising from 0.01 to 20 wt % of direct process residue gel, and baking the article at an elevated temperature.

According to a third aspect of the invention there is provided a method for making a ceramic article with increased compression strength, which method comprises forming a pre-ceramic article comprising from 0.01 to 10 wt % of direct process residue gel, and baking the article at an elevated temperature.

DETAILED DESCRIPTION OF THE INVENTION

As used herein, "clay" is given its dictionary definition, i.e. it refers to various forms of hydrated alumino silicate, e.g. those hydrated alumino silicates of general formula $Al_2O_3SiO_2 \cdot xH_2O$, where x is the degree of hydration.

As used herein, "spent bed material" refers to the residual material in a fluid bed resulting from the reaction of silicon metal with an organic halide or hydrogen chloride in a fluid bed in the manufacture of organohalosilanes and/or halosilanes in the direct process reaction.

As used herein, "ceramic" is given is dictionary definition, i.e. a hard, brittle product manufactured by the action of heat (e.g. firing) on earthy raw materials, in which silicon and its oxide and silicates occupy a predominant position.

The DPR gel can be incorporated into a wide variety of ceramics. However, particularly useful ceramics to which the methods of the present invention can be applied include for example structural clay products (bricks, tiles, terra cotta, architectural bricks), whitewares (dinnerware, chemical and electrical porcelain), porcelain enamels and refractories (materials that withstand high temperatures). Even more particularly, ceramics such as roofing panels, masonry bricks, cladding bricks, pavers, wafer bricks, boardings and ducts can benefit from the methods of the present invention.

The baking temperature required to convert the pre-ceramic article into the ceramic will vary according to the particular pre-ceramic in question, and the type of ceramic being made. Typical baking temperatures are between 700° C. and 1300° C. For the manufacture of ceramics such as roofing panels, masonry bricks, cladding bricks, pavers, wafer bricks etc. containing DPR gel, these typically require a thermal processing temperature of at least 850° C., e.g. ranging from 850 to 1100° C. Without being limited by theory, it is believed that at these temperatures the silicatic structure of DPR gel changes, embedding it irreversibly in the ceramic (usually clay) matrix of the finished article.

Importantly, the DPR gel can be incorporated into ceramic compositions without requiring significant process modifications or adding any significant production costs to existing ceramic manufacturing processes.

The precise composition of DPR gel will vary according to the reaction conditions of the particular direct process from which it results. However, typically the major components of DPR gel are hydrolysed disilanes, in an amount, for example, from 60 to 80 wt %. The remainder of the DPR gel comprises a variety of materials, typically including iron, silicon metal, organic materials, and salts (e.g. calcium chloride).

Ceramics made from a pre-ceramic mixture comprising DPR gel can show advantageous properties over ceramics made from a pre-ceramic mixture which does not contain any DPR gel. Such ceramics, amongst other things, can possess a lower density, increased strength, lower efflorescence, lower leachability, and/or improved aesthetic appearance over ceramic articles which were made from the same pre-mixture but not containing DPR gel.

It is highly preferred that the ceramic compositions comprise clay. The use of DPR gel as an additive has been found to be particularly advantageous in such clay-based ceramics. A preferred pre-ceramic mixture therefore comprises clay and DPR gel.

Commonly known examples of clays include Fuller's Earth, kaolin (China clay) and diatomite. A preferred clay for use in the present invention is a colloidal clay comprising montmorillonite.

The amount of DPR gel added to the pre-ceramic mixture (which is to be heated to form the ceramic) varies depending on the particular property of the ceramic one is looking to improve.

(i) Efflorescence

Low efflorescence and leachability are important properties for ceramics to possess. Efflorescence is the powdery substance formed as a result of a material efflorescing, i.e. becoming encrusted with a powder or crystals as a result of chemical change or the evaporation of a solution. The mechanisms of efflorescence are often complicated. However, one of the major causes appears to be water-soluble salts in solution being brought to the surface of a ceramic and deposited there by evaporation.

In bricks, efflorescence is the white-crystalline deposit of water-soluble salts which can sometimes be seen on the brick surface. The salts typically become water-insoluble at the surface through reaction with carbon dioxide and therefore are not washed off for example by rain water. This is highly unsightly and can be a particular problem in cladding bricks which are exposed to the weather. Also, certain vanadium and molybdenum compounds present in some ceramic units may produce a green deposit, commonly referred to as "green stain". Occasionally, "brown stain" may occur, resulting from deposits of manganese compounds.

DPR gel present at a level of from 0.01 to 20 wt % of the pre-ceramic mixture provides improved efflorescence properties, i.e. a lower level of efflorescence. Efflorescence may be measured as follows: A portion, for example a third of the volume, of a ceramic article is submerged in distilled water for one week. The article is then dried at room temperature and its surface checked for efflorescence by looking for the level of surface area covered by salt deposits, typically white spots in most cases.

Preferably the DPR gel is present in the pre-ceramic mixture in an amount of from 0.1 to 10 wt %, more preferably from 0.5 to 8 wt %, yet more preferably from 0.8 to 6.5 wt % and even more preferably from 1 to 5 wt % of the pre-ceramic mixture. We have found that the presence of DPR gel in the pre-ceramic mixture, even at relatively low levels, for example from 0.01 to 3 wt %, preferably from 0.1 to 2 wt % of the pre-ceramic mixture, can reduce the levels of efflorescence and leaching. This is highly advantageous for any ceramic articles which require improved efflorescence properties but which do not want a significant lowering of density. Such ceramics include cladding bricks and whitewares. Lower DPR gel levels are also advantageous in terms of regulatory and environmental provisions.

(ii) Density

Density is an important property in ceramics. Some ceramics require low density, high density. We have found that adding DPR gel to the pre-ceramic mixture can lower the density of a ceramic.

Preferably the DPR gel is present in the pre-ceramic mixture in an amount of from 0.1 to 10 wt %, more preferably from 1 to 12 wt %, yet more preferably from 2 to 10 wt % and yet more preferably from 3 to 8 wt % of the pre-ceramic mixture.

(iii) Compression Strength

We have found that adding DPR gel to the pre-ceramic mixture can increase the compression strength of a ceramic.

Preferably the DPR gel is present in the pre-ceramic mixture in an amount of at least 0.1 wt %, more preferably at least 1, yet more preferably at least 2, yet more preferably at least 3 and most preferably at least 4 wt %. The upper range limit is preferably up to 8 wt %, more preferably up to 7 wt % and most preferably up to 6.5 wt %.

Ceramics made according to the method of the present invention and containing higher levels of DPR gel, for example in the range from 4 to 8 wt %, tend to have a lower density whilst at the same time having higher compression strength. This is very unusual, as density and strength commonly have a negative correlation. The provision of strong but light ceramic materials is particularly useful in construction and thus the present invention has particular application in the production of for example masonry bricks.

In contrast to masonry bricks, compressive strength is not of major importance for cladding bricks. Furthermore, lower density is considered a negative, as it leads to higher water absorption. Thus, generally speaking, higher levels of DPR gel are usefully employed in the manufacture of masonry bricks, whereas lower levels of DPR gel are preferably used in the manufacture of cladding bricks, where efflorescence is of major importance. Compression strength may be measured using DIN 105.

The pre-ceramic mixture containing the DPR gel may be prepared by simply mixing together the pre-ceramic material, typically clay, and DPR gel using any suitable mixing equipment, for example an extruder or static mixer.

When clay is employed, the clay and DPR gel suitably account for at least 50 wt %, more preferably at least 60 wt %, and yet more preferably at least 70 wt % of the pre-ceramic mixture. The pre-ceramic mixture may contain other components, such as for example water. Water may be incorporated either by separate addition and/or by having some or all of the pre-ceramic material, typically clay, in a slurry form rather than in a "dry" form.

DPR gel, even after the dewatering step employed in its preparation, still contains from about 40 to 60 wt %, for example from 45 to 50 wt % of water. We have found that when using DPR gel as an additive in pre-ceramic mixtures, it is not necessary to add further water.

Other additives may be incorporated in the ceramic compositions through incorporation into the pre-ceramic mixture to impart further advantageous properties to the ceramic. A preferred additive is spent bed material as described in our unpublished United Kingdom Patent Application No. GB 0029774.7. Other useful additives that can be incorporated into the pre-ceramic mixture vary depending on the nature of the ceramic material being produced. For example, sintering agents can be incorporated into the pre-ceramic mixture in for example the manufacture of bricks. Useful sintering agents include boric acid, which may suitably be present in an amount of up to 1.0 wt %, preferably up to 0.5 wt % of the pre-ceramic mixture, and sodium borate. Another useful additive is barium carbonate, which can further lower the amount of efflorescence.

The present invention will now be further described by way of the following examples.

EXAMPLES

Example 1

Compression Strength of a Ceramic

A mixture of 3 wt % of DPR gel in a proprietary clay was prepared. Test samples were then prepared by taking 100 g samples of the clay mixture and baking at a temperature of 930° C. for a maximum of 60 minutes. The compression strength of the test samples was then tested by placing the test samples under a press and applying a measured pressure until the sample cracked. For comparison, test samples were prepared from the proprietary clay containing no DPR gel and tested in the same way. The results are shown in Table 1 below:

TABLE 1

| Additive | Load (10³kg) | Compression Strength (N/mm²) | Mean strength (kN/mm²) |
|---|---|---|---|
| None | 5.0 | 11.41 | 10.57 |
| None | 4.6 | 10.49 | |
| None | 4.3 | 9.81 | |
| 3% wt DPR gel | 5.4 | 12.32 | 12.25 |
| 3% wt DPR gel | 5.2 | 11.86 | |
| 3% wt DPR gel | 5.3 | 12.56 | |

Example 2

Laboratory Production of Masonry Bricks

A small scale laboratory test was carried out with masonry bricks made from a proprietary clay and containing from 18 to 22 wt % of water. DPR gel was mixed with the clay in amounts of 2, 3 and 5 wt % of the total mixture. The mixture was extruded, samples of the clay mixture cut and the samples baked in an electric oven. Samples were baked up to 750° C. at a temperature increase rate of 120° C./h, and then up to 920° C. at a temperature increase rate of from 40 to 80° C./h. The maximum temperature was held for 30 minutes. Masonry bricks of dimensions 10 cm×10 cm×10 cm were produced. Masonry bricks containing no DPR gel were also prepared for comparative purposes. The compressive strength and density of the bricks were measured. Compressive strength was measured in the direction of extrusion, the load bearing planes being ground parallel. The bricks were stressed to destruction by means of hydraulic press. The results are presented in Table 2.

TABLE 2

Density and compressive strength

| wt % DPR gel | Density (kg/dm³) | Compressive strength (N/mm²) |
|---|---|---|
| Zero | 1.63 | 20.03 |
| 2 | 1.63 | 22.36 |
| 3 | 1.61 | 21.23 |
| 5 | 1.60 | 20.14 |

The bricks containing DPR gel showed no visible difference from those containing no DPR gel. In addition, a lower density in combination with a higher compression strength was observed.

Further batches of bricks were made from the above proprietary clay. In one batch, 2 wt % of DPR gel was mixed with the clay and in another batch 2 wt % of a 1:1:0.3 weight ratio mixture of proprietary clay/spent bed material/DPR was mixed with the clay. A comparative batch containing no additives was also prepared. The clay mixtures were extruded, the extrudate cut and the samples baked in an electric oven. Samples were baked as described above up to a maximum temperature of 930° C. (DPR gel containing bricks) and 970° C. (DPR gel-free bricks). The compression strength of the bricks was tested and the results are given in Table 3. The surface area over which the load was applied in the compression test was 43 cm² in each case.

TABLE 3

Compression strength

| Additive | Load (10³kg) | Compression strength (N/mm²) | Mean strength (N/mm²) |
|---|---|---|---|
| None | 5.0 | 11.41 | 10.57 |
| | 4.6 | 10.49 | |
| | 4.3 | 9.81 | |
| 2 wt % DPR gel | 5.4 | 12.32 | 12.24 |
| | 5.2 | 11.86 | |
| | 5.6 | 12.55 | |
| 2 wt % clay/SB/DPR (1:1:0.3) | 5.3 | 12.09 | 12.17 |
| | 5.6 | 12.55 | |
| | 5.2 | 11.86 | |

Example 3

Large Scale Production of Masonry Bricks

To the proprietary clay of Example 2 was mixed about 10% by volume of sawdust. To this mixture, DPR gel was added via a worm wheel in a double axis mixer in an amount to produce clay mixtures comprising 4 wt % and 6.5 wt % of DPR gel. Bricks were formed from the mixture using an extrusion press. 5.6 ton batches (corresponding to one kiln car) were then baked at 920° C. Baking was performed in a tunnel-type kiln which was divided up in to pre-heating, baking and cooling zones, the material to be baked passing through in kiln cars. Baking was achieved by hot gasses from 5 oil burners passing through the kiln from the baking zone to the entrance. The total time for passage through the kiln was about 36 hours, a kiln car being in the baking zone at the maximum temperature for about 6 hours. Masonry bricks containing no DPR gel were also prepared for comparative purposes. Duplicate batches were prepared of the 6.5 wt % DPR gel bricks and the DPR gel-free bricks. The compressive strength and density of the bricks were measured and the results are presented in Tables 3 and 4.

TABLE 3

Density

| wt % DPR gel | Length (cm) | Width (cm) | Height (cm) | Weight (kg) | Density (kg/dm³) |
|---|---|---|---|---|---|
| Zero | 35.6 | 23.8 | 23.9 | 16.64 | 0.816 |
| 4.0 | | | | | 0.735 |
| 6.5 | 35.5 | 23.7 | 24.0 | 15.28 | 0.75 |

TABLE 4

Compressive strength

| wt % DPR gel | Yield Load (kN) | Surface (cm2) | Compressive Strength N/mm² | Mean compressive strength (N/mm²) |
|---|---|---|---|---|
| Zero | 660 | 847.28 | 7.70 | 8.16 |
| Zero | 720 | 846.56 | 8.51 | |
| 4 | | | | 7.53 |
| 6.5 | 780 | 841.36 | 9.27 | 8.66 |
| 6.5 | 680 | 844.32 | 8.05 | |

The levels of HCl in the exhaust fumes was measured for 4 kiln cars (22.4 tons of bricks with 6.5 wt % DPR gel). No elevated values for HCl were detected.

The following observations were made with the masonry bricks prepared from clay containing 6.5 wt % DPR gel when compared with the DPR gel-free bricks:

DPR gel improved the plasticity of the clay which resulted in a reduction in the pressure in the extruder press from 12.5 to 11 bar.

Reducing the steam addition to the extruder from 50% to 0 led to the required pressure returning to 12.5 bar. This could provide considerable cost savings in terms of the steam required for extrusion.

There was no increased tendency of the bricks to crack during drying.

There was no increase in the formation of reduction cores in the baked bricks.

There was a mean improvement of 7% in compressive strength of the baked bricks, despite their being of lower density.

The baked bricks had significantly improved leachate (i.e. less efflorescence effects)

The proprietary clay has a high content of iron and illite and a fluctuating content of calcium carbonate (from 3 to 30 wt %). This results in bricks with an occasional tendency towards efflorescence, in particular of calcium salts. Table 5 gives the values for leachate for the 6.5 wt % DPR gel bricks compared to bricks containing no DPR gel. The effective reduction in efflorescence is mainly due to the low leachibility of sulphate. This is further illustrated by the low conductivity.

TABLE 5

Values for leachate

| Parameter | Zero DPR gel | 6.5 wt % DPR |
| --- | --- | --- |
| Conductivity (µs/cm) | 467.0 | 305.0 |
| Chloride (mg/l) | not detectable | 3.9 |
| Sulphate (mg/l) | 82.0 | 37.9 |
| Cyanide (mg/l) | not detectable | not detectable |
| Phenol index (mg/l) | not detectable | not detectable |
| Arsenic (mg/l) | 0.004 | 0.0023 |
| Lead (mg/l) | not detectable | not detectable |
| Cadmium (mg/l) | not detectable | not detectable |
| Chromium (mg/l) | 0.16 | 0.10 |
| Copper (mg/l) | not detectable | not detectable |
| Nickel (mg/l) | not detectable | not detectable |
| Mercury (mg/l) | not detectable | not detectable |
| Zinc (mg/l) | not detectable | not detectable |

Example 4

Further Large Scale Production of Masonry Bricks

To the proprietary clay of example 2 was mixed in about 4.5% by volume of sawdust and 5% by volume of Styrofoam (trade mark). A mixture of DPR gel and residual coke in a weight ratio of 7:3 was screened to a maximum particle size of 5 mm. The DPR gel mixture was then added to the proprietary clay mixture by a worm wheel in a double axis mixer in an amount to produce a clay mixture comprising about 4 wt % of DPR gel. A total of 19 kiln cars with 5.6 tons load each were baked as described in Example 3. A comparative batch was also prepared containing no DPR gel. The compressive strength and density of the bricks were measured and the results are presented in Table 6.

TABLE 6

Density and compressive strength

| wt % DPR gel | Density (kg/dm$^3$) | Compressive strength (N/mm$^2$) | Total shrinkage (%) |
| --- | --- | --- | --- |
| None | 0.74 | 7.29 | 10.4 |
| 4 | 0.72 | 8.27 | 10.4 |

The same positive observations as detailed in Example 3 were made with the masonry bricks prepared from clay containing 4 wt % DPR gel as compared with the DPR gel-free bricks.

Example 5

Efflorescence from Cladding Bricks

Samples of cladding bricks were prepared from a proprietary base clay that was very plastic and which had relatively high levels of sodium sulphate, calcium sulphate and pyrite. The high concentration of these various salts meant that bricks produced from this clay had a high tendency to effloresce. To this base clay was added DPR gel in various amounts along with, in some cases, barium carbonate. The clay mixtures were extruded, cut and samples baked at 1030° C. The efflorescence of the resulting bricks was measured by submerging a third of the volume of a sample brick in distilled water for one week. The sample brick was then dried and its surface checked for efflorescence. The results are presented in Table 7. "Very little" efflorescence means white spots containing water insoluble salts are just detectable on the surface; "Little" efflorescence means up to 2% of the surface area is covered with white spots; "Medium" efflorescence means between 2 and 10% of the surface area is covered; "Strong" efflorescence means greater than 10% of the surface area is covered.

TABLE 7

Efflorescence data

| Additives | Efflorescence characteristics |
| --- | --- |
| None | Medium |
| 2 wt % DPR gel | Little |
| 2 wt % DPR gel Barium carbonate | Very little |
| 3 wt % DPR gel Barium carbonate | Very little |
| 6 wt % DPR gel Barium carbonate | Very little |

What is claimed is:

1. A method for making a ceramic article with improved efflorescence properties, which method comprises forming a pre-ceramic article comprising from 0.01 to 20 wt % of direct process residue gel resulting from the neutralisation and dewatering of higher boiling point halosilanes produced by the direct process reaction of silicon and an organic halide or hydrogen chloride, and baking the article at an elevated temperature.

2. A method for making a ceramic article with lower density, which method comprises forming a pre-ceramic article comprising from 0.01 to 20 wt % of direct process residue gel resulting from the neutralisation and dewatering of higher boiling point halosilanes produced by the direct process reaction of silicon and an organic halide or hydrogen chloride, and baking the article at an elevated temperature.

3. A method for making a ceramic article with increased compression strength, which method comprises forming a pre-ceramic article comprising from 0.01 to 10 wt % of direct process residue gel resulting from the neutralisation and dewatering of higher boiling point halosilanes produced by the direct process reaction of silicon and an organic halide or hydrogen chloride, and baking the article at an elevated temperature.

4. A method according to claim 1, in which the pre-ceramic article comprises clay.

5. A method according to claim 1, in which the pre-ceramic article comprises spent bed material.

6. A method according to claim 2, in which the ceramic article is selected from the group consisting of a roofing panel, masonry brick, cladding brick, paver, wafer brick, boarding and duct.

7. A method according to claim 2, in which the pre-ceramic article comprises clay.

8. A method according to claim 3, in which the pre-ceramic article comprises clay.

9. A method according to claim 1, in which the ceramic article is a cladding brick.

10. A method according to claim 3, in which the ceramic article is a masonry brick.

* * * * *